US010473766B2

(12) United States Patent
Spector (10) Patent No.: US 10,473,766 B2
(45) Date of Patent: Nov. 12, 2019

(54) LIGHT DETECTION AND RANGING (LIDAR) SYSTEM AND METHOD

(71) Applicant: The Charles Stark Draper Laboratory, Inc., Cambridge, MA (US)

(72) Inventor: Steven J. Spector, Lexington, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 276 days.

(21) Appl. No.: 15/634,672

(22) Filed: Jun. 27, 2017

(65) Prior Publication Data

US 2018/0259626 A1    Sep. 13, 2018

Related U.S. Application Data

(60) Provisional application No. 62/470,706, filed on Mar. 13, 2017.

(51) Int. Cl.
*G01C 3/08* (2006.01)
*G01S 7/481* (2006.01)
(Continued)

(52) U.S. Cl.
CPC ............ *G01S 7/4817* (2013.01); *G01S 7/484* (2013.01); *G01S 7/4814* (2013.01);
(Continued)

(58) Field of Classification Search
CPC ...... G01S 7/4817; G01S 7/484; G01S 7/4816; G01S 7/4814; G01S 17/89; G01S 17/10; G01S 7/4863
See application file for complete search history.

(56) References Cited

U.S. PATENT DOCUMENTS 5,059,008 A   10/1991   Flood et al.
5,392,157 A    2/1995   Shih
(Continued)

FOREIGN PATENT DOCUMENTS

AU    2012314077 B2    4/2013    ............ G01S 7/497
GB       2300325 A    10/1996    ............ G01S 7/481
(Continued)

OTHER PUBLICATIONS

International Searching Authority, International Search Report—International Application No. PCT/US2018/014043 dated Apr. 20, 2018, together with the Written Opinion of the International Searching Authority, 13 pages.
(Continued)

*Primary Examiner* — Samantha K Abraham
(74) *Attorney, Agent, or Firm* — Sunstein Kann Murphy & Timbers LLP (57) ABSTRACT

A LiDAR system and scanning method creates a two-dimensional array of light spots. A scan controller causes the array of light spots to move back and forth so as to complete a scan of the scene. The spots traverse the scene in the first dimensional direction and in the second dimensional direction without substantially overlapping points in the scene already scanned by other spots in the array. An arrayed micro-optic projects the light spots. Receiver optics includes an array of optical detection sites. The arrayed micro-optic and the receiver optics are synchronously scanned while maintaining a one-to-one correspondence between light spots in the two dimensional array and optical detection sites in the receiver optics.

23 Claims, 12 Drawing Sheets

(51) Int. Cl.
*G01S 17/89* (2006.01)
*G01S 17/10* (2006.01)
*G01S 7/486* (2006.01)
*G01S 7/484* (2006.01)

(52) U.S. Cl.
CPC .......... *G01S 7/4816* (2013.01); *G01S 7/4863* (2013.01); *G01S 17/10* (2013.01); *G01S 17/89* (2013.01)

(56) References Cited

U.S. PATENT DOCUMENTS

| | | | |
|---|---|---|---|
| 5,878,152 A | 3/1999 | Sussman | 382/106 |
| 5,943,159 A | 8/1999 | Zhu | |
| 6,028,306 A | 2/2000 | Hayashi | |
| 6,104,945 A | 8/2000 | Modell et al. | 600/473 |
| 6,121,603 A | 9/2000 | Hang et al. | 250/216 |
| 7,242,460 B2 | 7/2007 | Hsu et al. | 356/4.01 |
| 7,400,384 B1 | 7/2008 | Evans et al. | 356/5.01 |
| 7,928,555 B2 | 4/2011 | Lin | |
| 8,290,305 B2 | 10/2012 | Minear et al. | 382/294 |
| 8,493,445 B2 | 7/2013 | Degnan, III et al. | 348/144 |
| 8,767,190 B2 | 7/2014 | Hall | 356/5.01 |
| 8,958,057 B2 | 2/2015 | Kane et al. | 356/4.01 |
| 9,041,915 B2 | 5/2015 | Earhart et al. | |
| 9,245,170 B1 | 1/2016 | Nikic et al. | G06K 9/00201 |
| 9,267,787 B2 | 2/2016 | Shpunt et al. | |
| 9,277,204 B2 | 3/2016 | Gilliland et al. | H04N 13/025 |
| 9,280,748 B2 | 3/2016 | Nugent | 706/12 |
| 9,292,922 B2 | 3/2016 | Facchin et al. | G06T 7/0024 |
| 9,347,793 B2 | 5/2016 | Meeker et al. | G01C 23/00 |
| 9,424,672 B2 | 8/2016 | Zavodny et al. | G06T 11/60 |
| 9,476,983 B2 | 10/2016 | Zeng | G01S 17/87 |
| 9,575,184 B2 | 2/2017 | Gilliland et al. | G01S 17/89 |
| 2006/0044546 A1 | 3/2006 | Lewin et al. | 356/4.04 |
| 2007/0057211 A1 | 3/2007 | Bahlman et al. | |
| 2007/0279615 A1 | 12/2007 | Degnan et al. | |
| 2009/0034042 A1 | 2/2009 | Tholl et al. | |
| 2009/0169221 A1 | 7/2009 | Cho et al. | 398/214 |
| 2011/0210971 A1 | 9/2011 | Palais et al. | 345/420 |
| 2012/0236379 A1 | 9/2012 | da Silva et al. | 359/200.8 |
| 2014/0313519 A1 | 10/2014 | Shpunt et al. | 356/612 |
| 2015/0036870 A1 | 2/2015 | Mundhenk et al. | 382/100 |
| 2015/0131080 A1 | 5/2015 | Retterath et al. | G01S 17/936 |
| 2015/0219764 A1 | 8/2015 | Lipson | G01S 17/08 |
| 2016/0047903 A1 | 2/2016 | Dussan | G01S 7/4861 |
| 2016/0161218 A1 | 6/2016 | Laine et al. | F41G 3/145 |
| 2016/0266242 A1 | 9/2016 | Gilliland et al. | G01S 7/4814 |
| 2017/0131388 A1 | 5/2017 | Campbell et al. | G01S 7/4817 |

FOREIGN PATENT DOCUMENTS

| | | | |
|---|---|---|---|
| WO | WO 02/14846 A2 | 2/2002 | |
| WO | WO 02/082016 A1 | 10/2002 | G01C 3/08 |

OTHER PUBLICATIONS

Ailisto et al., "Scannerless imaging pulsed-laser range finding," Journal of Optics A: Pure and Applied Optics, vol. 4, pp. S337-S346, Nov. 4, 2002.

Chen et al., "Two-channel Hyperspectral LiDAR with a Supercontinuum Laser Source," Sensors, ISSN 1424-8220, vol. 10, pp. 7057-7066, Jul. 23, 2010.

Christian et al., "A Survey of LIDAR Technology and its Use in Spacecraft Relative Navigation," American Institute of Aeronautics and Astronautics, 7 pages, Aug. 19, 2013.

English et al., "TriDAR: A hybrid sensor for exploiting the complementary nature of triangulation and LIDAR technologies," Proceedings of 'The 8th International Symposium on Artificial Intelligence, Robotics and Automation in Space—iSAIRAS,' Munich, Germany, Sep. 5-8, 2005, 9 pages.

Stular et al., "Visualization of lidar-derived relief models for detection of archaeological features," Journal of Archaeological Science, vol. 39, No. 11, pp. 3354-3360, Nov. 2012.

Sudharsanan et al., "Low Cost Scanning LiDAR Imager," LiDAR Magazine, vol. 3, No. 2, 4 pages, 2013.

Texas Instruments Inc., "TDC7201 Time-to-Digital Converter for Time-of-Flight Applications in LIDAR, Range Finders, and ADAS," Texas Instruments Inc., SNAS686, 50 pages, May 2016.

Unknown, "Scanning 3-D Ladar," Laser Radar: Progress and Opportunities in Active Electro-Optical Sensing, Chapter 2, Active Electro-Optical Sensing Approaches, National Research Council, The National Academies of Sciences, Engineering Medicine, Chapter 2, The National Academies Press, pp. 33-35, 2014.

Unknown, "Type of LiDAR Systems—MEMs Based LiDAR," Hamamatsu Photonics, ADAS Sensors 2017, $2^{nd}$ Annual Conference and Exhibition, Detroit, Michigan, May 17-18, 2017, 1 page.

Diffractive optical element
(Fresnel zone-plate) array

LIGHT DETECTION AND RANGING (LIDAR) SYSTEM AND METHOD

The present application claims priority from U.S. provisional application Ser. No. 62/470,706, filed Mar. 13, 2017, which is hereby incorporated herein by reference in its entirety.

TECHNICAL FIELD

The present invention relates to range detection systems, and more particularly to light detection and ranging (LiDAR) systems.

BACKGROUND ART

Range detection systems, such as LiDAR, can be used to collect three dimensional images of a scene. A scene, as used herein, is a contiguous portion of a physical space accessible to being viewed. Typically, a laser beam or multiple beams are scanned across the scene in a raster scan fashion. Optical pulses are transmitted at timed intervals. A collector of backscattered light reflected off of objects in the scene focuses the light onto a photosensitive detector. The signal produce by the detector is analyzed to determine time of arrival so that the distance can be calculated based on the total round trip time of the pulse. The raster scan repeatedly repositions the scan back and forth across the scene so as to produce a three dimensional mapping of the scene. The mapping is a representation of the geometric shape of the scene in spherical coordinates originating at the sensor. Trigonometric functions can be used to convert the image to Cartesian coordinates.

The mechanics required to rapidly scan back and forth across the scene can be complex, expensive and subject to performance degrading wear and tear. A variety of mechanical options have been developed for laser scanning. These include mechanically operated translational stages, adjustable prisms and adjustable mirrors.

SUMMARY OF THE EMBODIMENTS

In accordance with one embodiment of the invention, a LiDAR system includes an arrayed micro-optic configured to receive light from a light source so as to produce and project a two dimensional array of light spots on a scene. Receiver optics include an array of optical detection sites for establishing a one-to-one correspondence between light spots in the two dimensional array and the optical detection sites. At least one scanner synchronously scans the light spots and the receiver optics so as to maintain the one-to-one correspondence. Given a first dimensional direction, such as horizontal, and a second dimensional direction, such as vertical, the scan is controlled so as to move the array of light spots back and forth so as to complete a scan of the scene wherein, the spots traverse the scene in the first dimensional direction and in the second dimensional direction no more than 150%, or more preferably 125% or still more preferably 110%, of the distance between adjacent spots in the first dimensional direction and in the second dimensional direction, respectively. Most preferably, the spots traverse the scene in the first dimensional direction and in the second dimensional direction no more than the distance between adjacent spots in the first dimensional direction and in the second dimensional direction, respectively.

In a further embodiment of the invention, the receiver optics includes a mask defining a plurality of transparent apertures arranged according to the two dimensional array, the plurality of transparent apertures limiting visibility by each optical detection site to a single corresponding light spot in the two dimensional array.

A method embodiment of the invention involves activating a light from a light source and projecting the light through an arrayed micro-optic to produce the two dimensional array of light spots. Reflected light from the array of light spots is received in one-to-one correspondence at an array of optical detection sites. The two dimensional array of light spots are scanned to complete a scan of the scene in such a manner that the spots traverse the scene in the first dimensional direction and in the second dimensional direction without substantially overlapping points in the scene already scanned by other spots in the array. By completing a scan without requiring the scanner to swivel the beams any more than the distance between adjacent spots, the performance burden on the scanning mechanics is significantly lessened.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
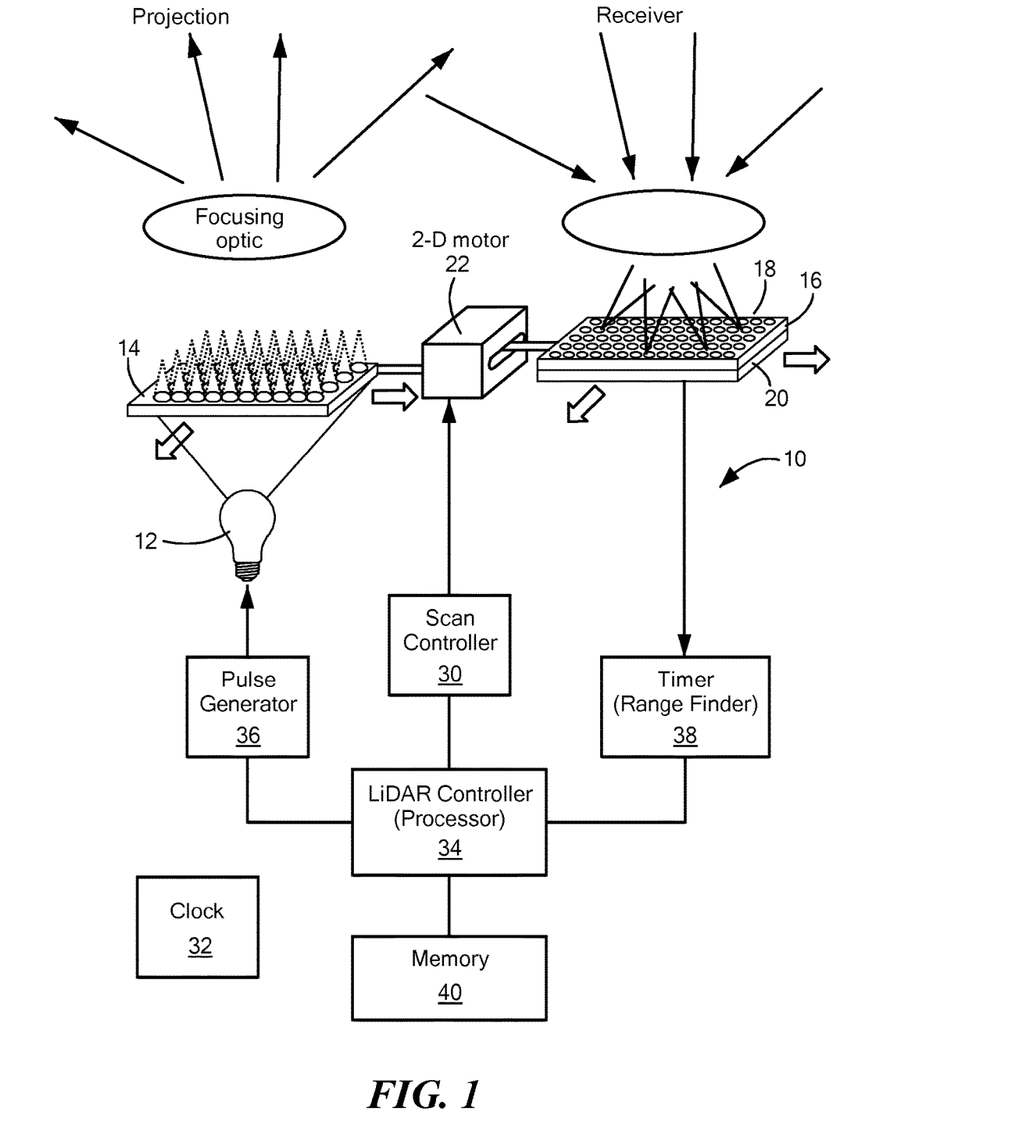
FIG. 1 is a schematic diagram of a LiDAR system suitable for the present invention.
Figure 9:
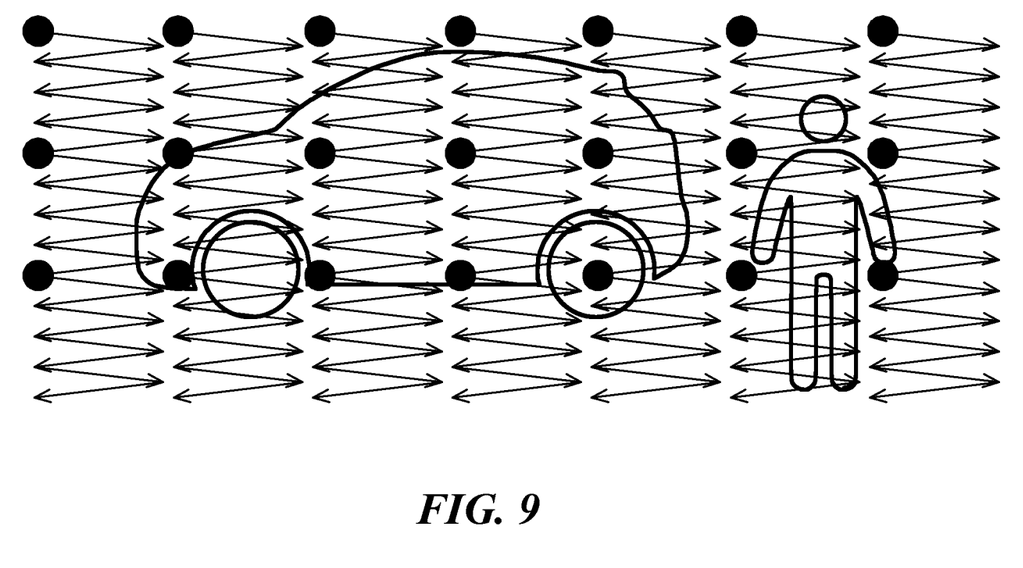
FIG. 9 is a schematic drawing of a raster scan performed with a two dimensional array of light spots in accordance with the scanning control of the present invention.

FIG. 1 illustrates a LiDAR system 10, in accordance with the invention, specially adapted for scanning a scene in the manner shown on FIG. 9. In order to project a two dimensional array of light spots on a scene, a single light source 12 transmits light through an arrayed micro-optic 14. While any of a variety of light sources may be employed within the scope of the present invention, a preferred light source is a laser. In using a single light source, the system only needs to generate light pulses from the single source and monitor timing only with respect to those generated light pulses. Complications and extra components associated with multiple light sources is avoided. The arrayed micro-optic 14 is configured to receive light from the light source 12 so as to project multiple light spots. The arrayed micro-optic may use methods such as a diffractive optic, a lens array or a simple aperture array.

Figure 2A:
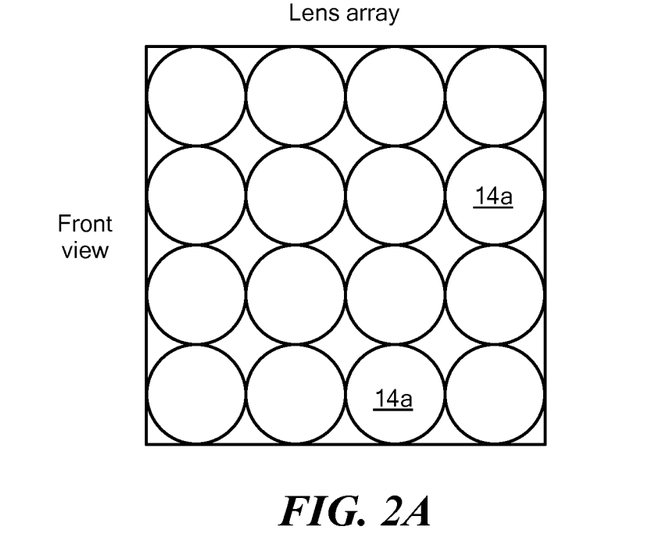
FIG. 2A is a front view of a lens array for use as the arrayed micro-optic in an embodiment of the present invention.
Figure 2B:
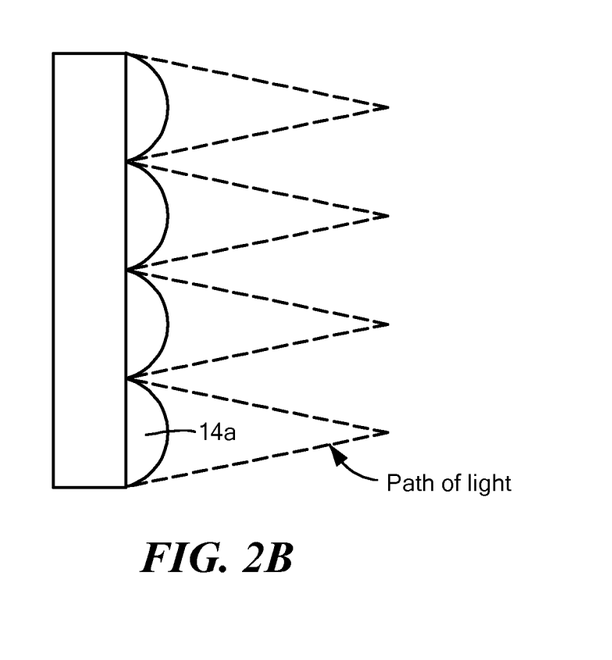
FIG. 2B is a side cross-sectional view of FIG. 2A with light paths shown in dashed lines.

Referring now to FIGS. 2A-4B, examples of arrayed micro-optics are illustrated. A lens array is shown in FIGS. 2A-2B. The array includes a plurality of lenses 14a each receiving light and projecting a light spot as shown in FIG. 2B. An example of a lens array may be a microlens, such as one of the many microlens arrays sold by SÜSS MicroOptics SA of Hauterive, Switzerland.

Figure 3A:
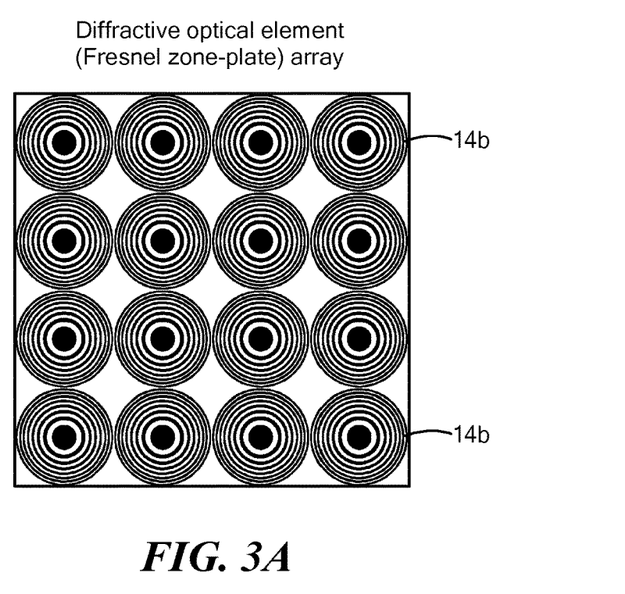
FIG. 3A is a front view of a diffractive optical element for use as the arrayed micro-optic in an embodiment of the present invention.
Figure 3B:
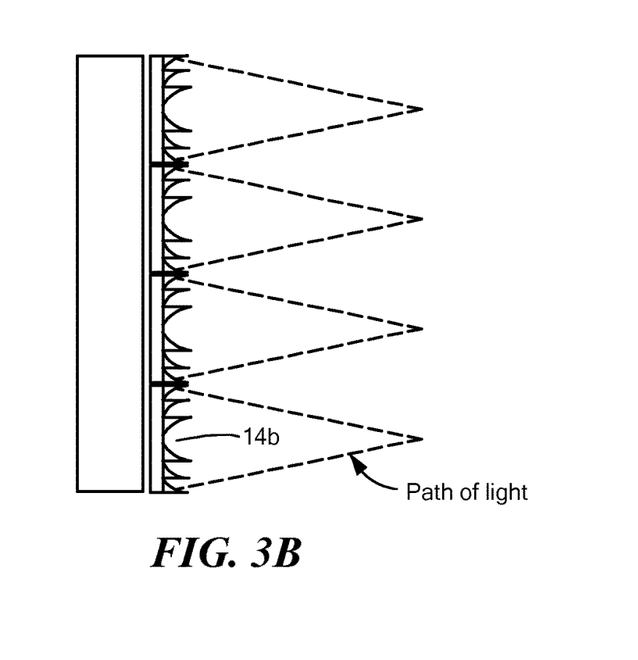
FIG. 3B is a side cross-sectional view of FIG. 3A with light paths shown in dashed lines.

Referring to FIGS. 3A-3B, a diffractive optical element array may similarly be chosen as the arrayed micro-optic. In particular, each diffractive optical element 14b may be a Fresnel zone plate. Light received by each diffractive optical element is projected to form a light spot as shown in FIG. 3B.

Figure 4A:
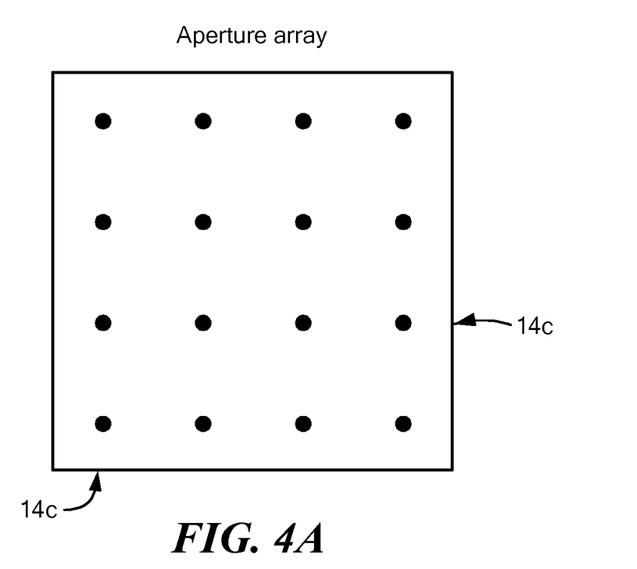
FIG. 4A is a front view of an aperture array for use in an arrayed micro-optic in an embodiment of the present invention.
Figure 4B:
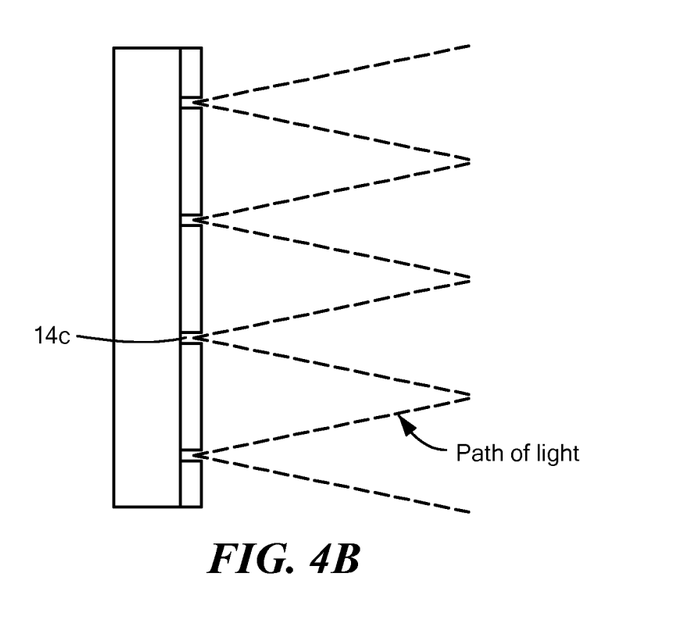
FIG. 4B is a side cross-sectional view of FIG. 4A with light paths shown in dashed lines.

Referring to FIGS. 4A-4B, an aperture array may configured in the system as the arrayed micro-optic. The array of apertures 14c may focus received light to project an array of light spots as shown in FIG. 4B.

In accordance with embodiments of the present invention, an array of optical detection sites are formed in receiver optics 16. The optical detection sites are configured for establishing a one-to-one correspondence between the light spots in the two dimensional array and the optical detection sites. The individual optical detection sites help minimize cross-talk among the reflected light from the spots. The receiver optics 16 function much like the arrayed micro-optic 14 with the spots being focused on the individual optical detection sites. The receiver optics may include multiple detectors each located at one of the optical detection sites. A pixelated optical sensor array 20 may work alone or in conjunction with an aperture array 18 for defining the optical detection sites on the sensor array. For example, Princeton Lightwave, Inc. of Cranbury, N.J. makes a variety of pixelated optical sensor arrays, including for example the Merlin 32×32 free-running LiDAR camera, which may be used to perform the functions of the detector array 20. For an optical sensor array in which the detectors are much smaller than the spacing between the detectors (fill factors less than 10%), such as in the Princeton Lightwave camera, the individual optical detection sites for correspondence with individual light spots are defined by the array itself. For detectors with a large fill factor, an aperture array may be beneficial to establish the individual optical detection sites. As such, the receiver optics will include a mask 18 defining a plurality of transparent apertures arranged according to the two dimensional array. The plurality of transparent apertures limits visibility by each optical detection site to a single corresponding light spot in the two dimensional array.

The arrayed micro-optic 14 and the receiver optics 16 are synchronously scanned so that correspondence is maintained between the spots in the two dimensional array and the optical detection sites. At least one scanner 22 is arranged with respect to the arrayed micro-optic 14 and the receiver optics 16 so that the scanning can be done by physically oscillating the arrayed micro-optic or by scanning the projected light (with mirrors or prisms) after the lens. According to one embodiment, the array of projected light beams and the array of received light beams are arranged co-axially for passing through a beam splitter. In a simple such arrangement, the receiver optics may be arranged on the scanner 22 orthogonal to the arrayed micro-optic 14. In other embodiments, the arrayed micro-optic 14 and receiver optics 16 are spaced apart on at least one scanner as shown in FIG. 1. In this approach, there may be a certain amount of distortion due to the parallax problem. To accommodate this effect, one can oversize the optical detection sites preferably only in the relevant dimension. Another accommodation could involve making the receiver optics well focused at long distances. At nearer distances, the loss of signal strength due to defocusing may be overcome by the increased light strength of light reflected from near objects. The arrayed micro-optic 14 and receiver optics 16 may be mounted on the same scanner and oriented with a slight angle toward each other so that they both point at the same place in the distance. The position of the receiver optics relative to the arrayed micro-optic can be chosen to give the best performance at all ranges of interest, which may not necessarily be when the projected spots and receiver optics are both aligned at infinity. In an alternative, separate synchronously controlled scanners may be used for each of the arrayed micro-optic 14 and receiver optics 16.

Figure 5A:
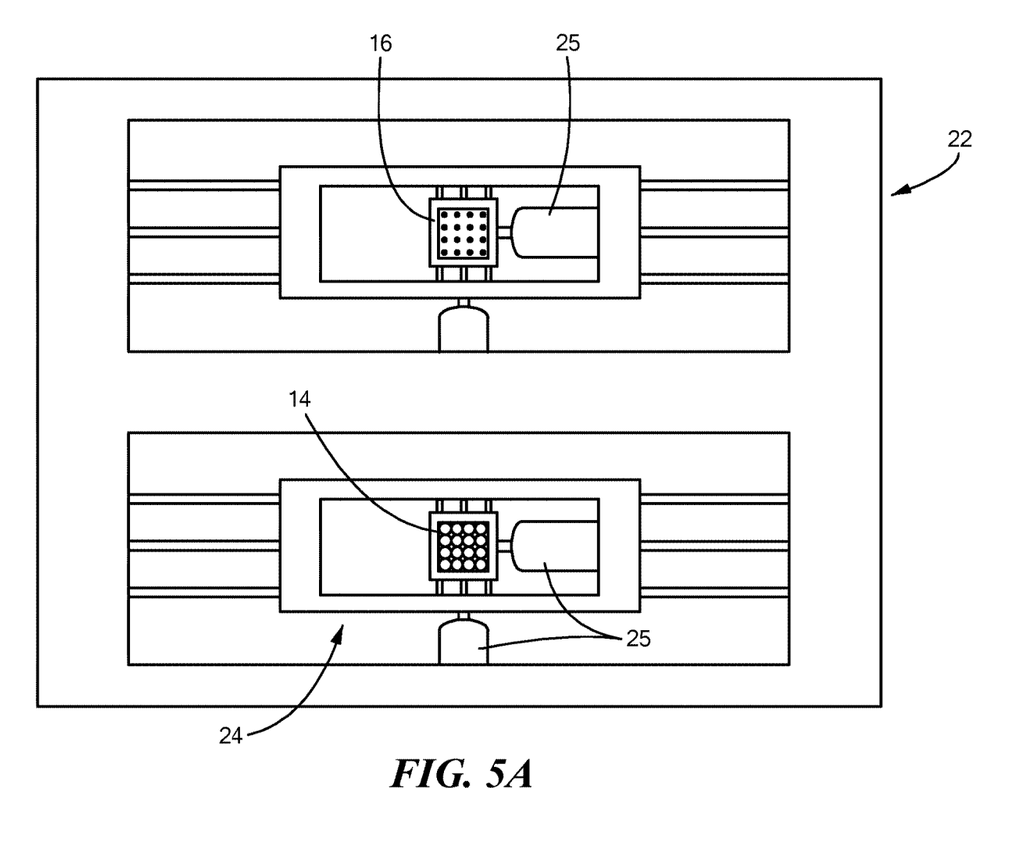
FIG. 5A is a schematic drawing of a voice-coil driven flexure stage for use as the scanner in a LiDAR system of the present invention.
Figure 5B:
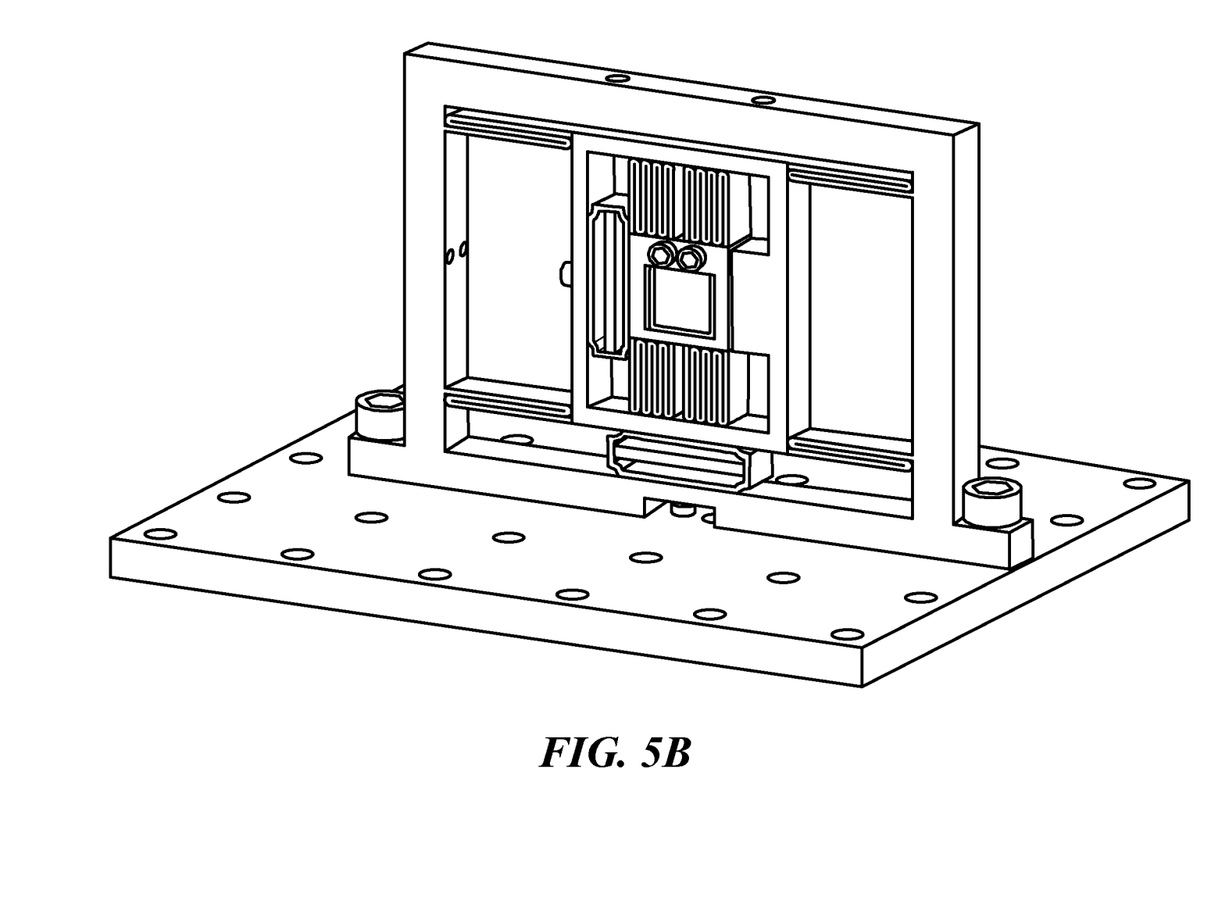
FIG. 5B is a schematic drawing of a piezo actuator driven flexure stage for use as a scanner in a LiDAR system of the present invention.
Figure 6:
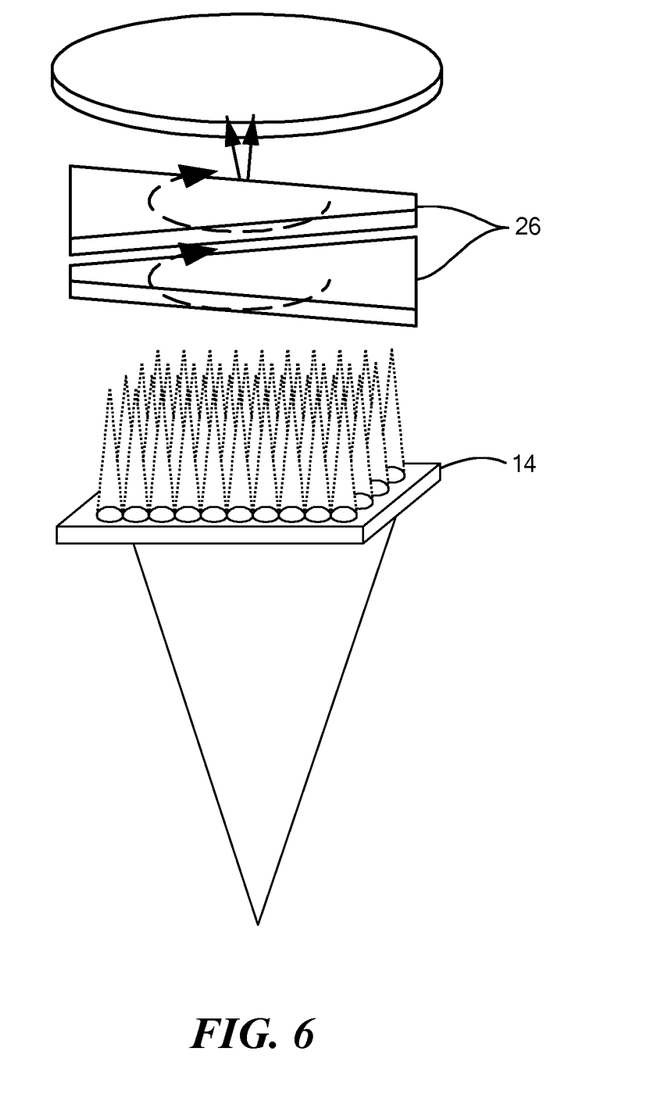
FIG. 6 is a schematic drawing of Risley prisms for use as a scanner in a LiDAR system of the present invention.
Figure 7:
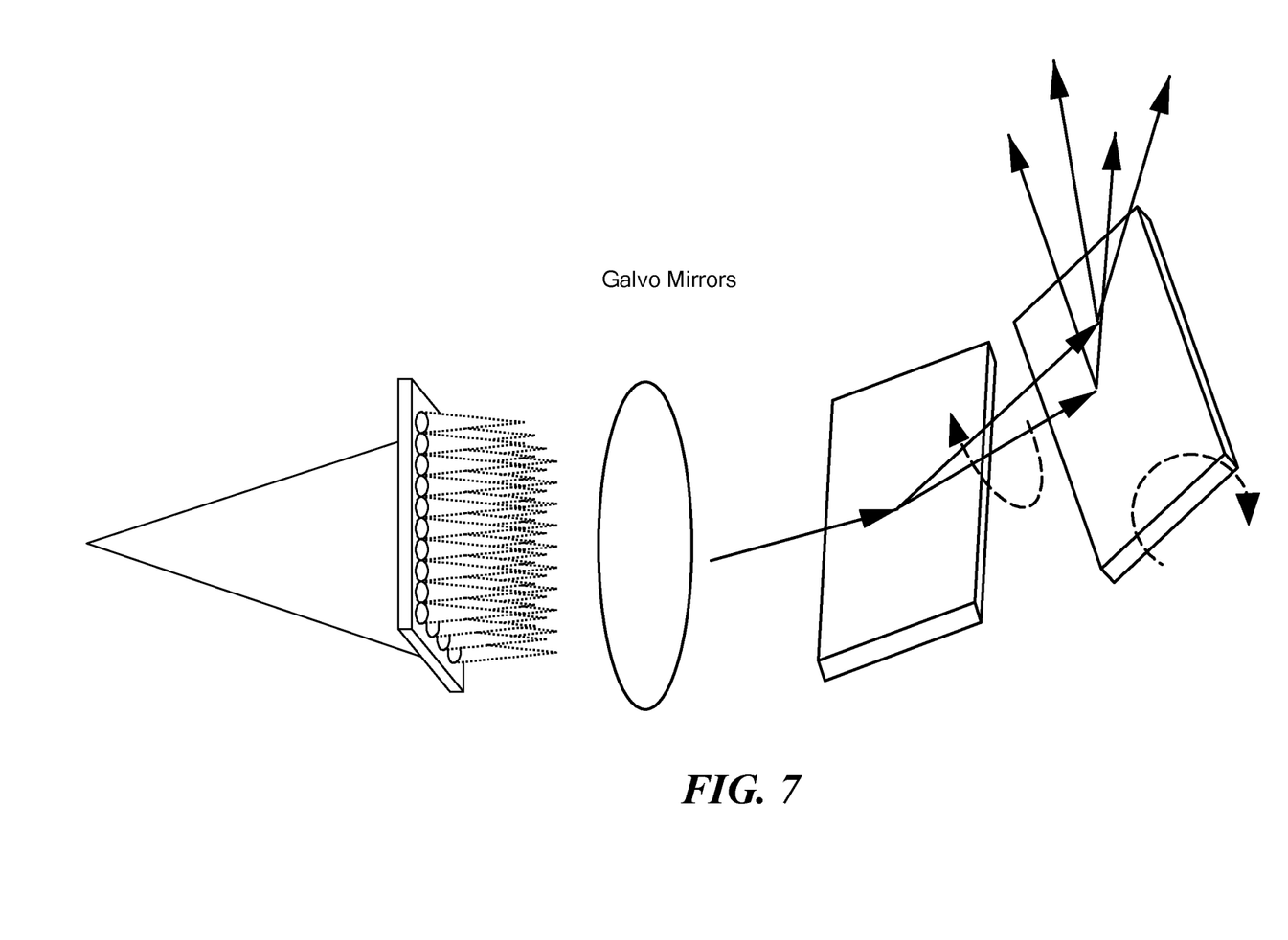
FIG. 7 is a schematic drawing of Galvo mirrors for use as a scanner in a LiDAR system of the present invention.
Figure 8A:
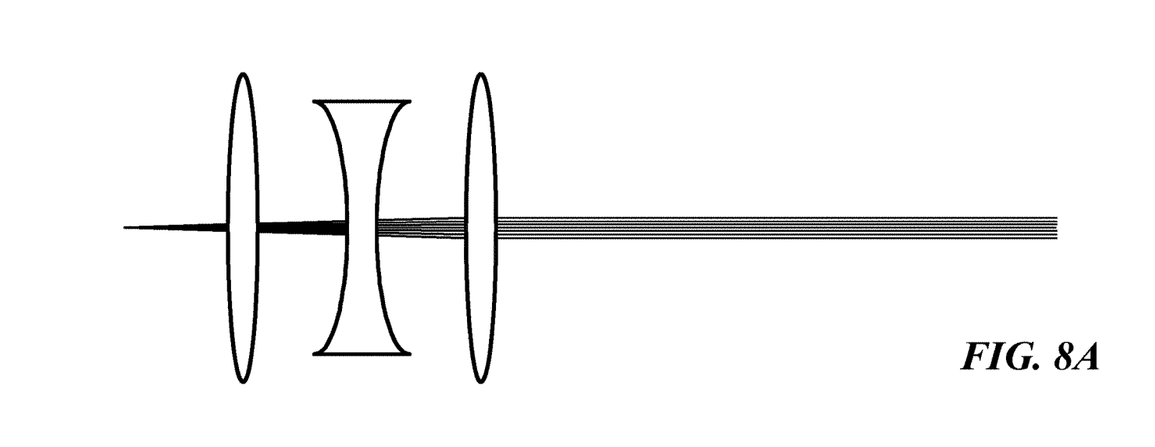
FIGS. 8A and 8B are a schematic drawings of a compound lens in which one of the lens is moved from its position as shown in FIG. 8A to a position as shown in FIG. 8B.
Figure 8B:
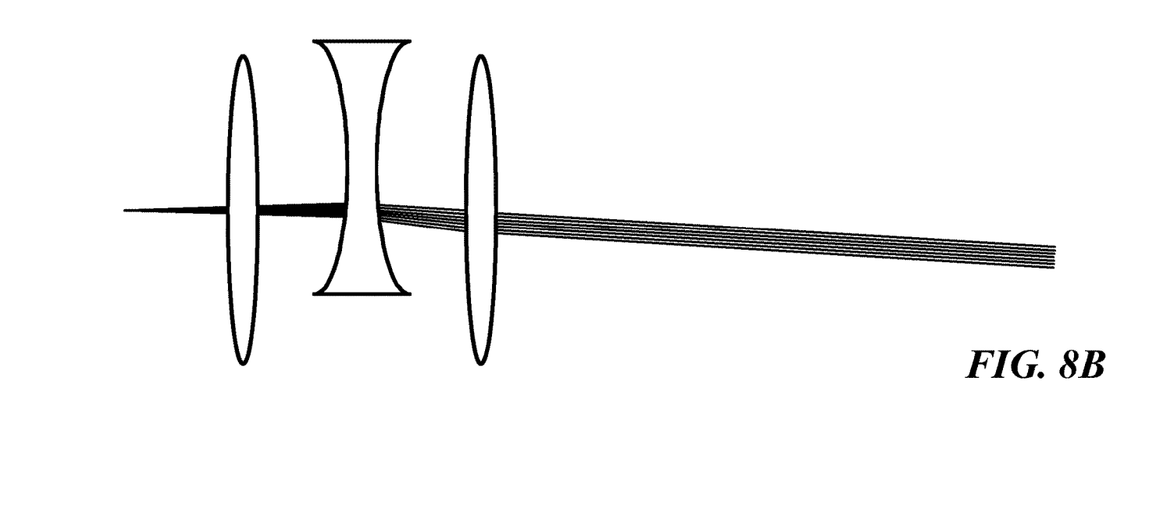

FIGS. 5A and 5B illustrate one option for scanner 22. The scanner 22 may include a miniature x-y stage 24. The x-y stage may be driven by any suitable actuator. In FIG. 5A, voice coil actuators 25 are shown. In FIG. 5B, a piezo actuator is shown for use with the x-y stage 24. Another scanning option is shown in FIG. 6. Prisms 26 may be arranged after the arrayed micro-optic. For example, Risley prisms may be used. Oscillation of the prisms by the scanner achieves the desired scanning of the two dimensional array of light spots. A beam splitter may be inserted between the prisms 26 and the lens to redirect received light to the receiver optics 16. Alternatively, the receiver optics 16 can be separately configured with its own set of prisms. Instead of prisms 25, mirrors 28 may be used and oscillated by the scanner 22 as shown in FIG. 7. For example, a set of Galvo mirrors may be used. Furthermore, the scanner may be accomplished with a compound lens in which controlled movement of one or more of the lens elements moves the array of light spots along the scanning path or, in the case of the receiver optics, maintains the one-to-one correspondence between the optical detection sites and their corresponding light spots. FIGS. 8A and 8B show a compound lens in which the position of one of the lens elements has been moved to redirect the array of light spots when used with the arrayed micro-optic. In the case of the receiver optics, the compound lens reorients the focus of the optical detection sites to maintain the one-to-one correspondence.

Referring back to FIG. 1, a scan controller 30 operates to cause the scanner 22 to move the array of light spots back and forth so as to complete a scan of the scene. In particular, as illustrated in FIG. 9, the spots traverse the scene in a first dimensional direction, such as horizontally, and in a second dimensional direction, such as vertically. The spots traverse the scene in the first dimensional direction and in the second dimensional direction no more than 150%, or more preferably 125% or still more preferably 110%, of the distance between adjacent spots in the first dimensional direction and in the second dimensional direction, respectively. While overlapping points already scanned by other spots in the array can be permitted, there is no need to do so. Thus, it is most preferable that the spots traverse the scene in the first dimensional direction and in the second dimensional direction by no more than the distance between adjacent spots in the first dimensional direction and in the second dimensional direction, respectively. Typically, the first dimensional direction and the second dimensional direction are perpendicular. As shown in FIG. 9, a preferred scan follows a raster path. By using a two dimensional array of light spots over a wide field of view and by limiting the movement in each direction to the distance between spots (or with some overlap), the mechanical movement of the scanner 22 is minimized and yet a complete scan of the scene is accomplished.

The components for accomplishing range detection with respect to any given beam of light are known in the art. A clock signal 32 provides a basis for the timing in the system. A LiDAR controller 34 may be a programmed processor for determining the time-of-flight of a pulse of light activated by a pulse generator 36 and received in the receiver optics 16. The receive signal from the optics is provided to a range finder timer 38. The LiDAR controller 34 can calculate distance from the time-of-flight of the light beam from its generation to its receipt. Scanning data may be stored by the controller 34 in memory 40.

Figure 10A:
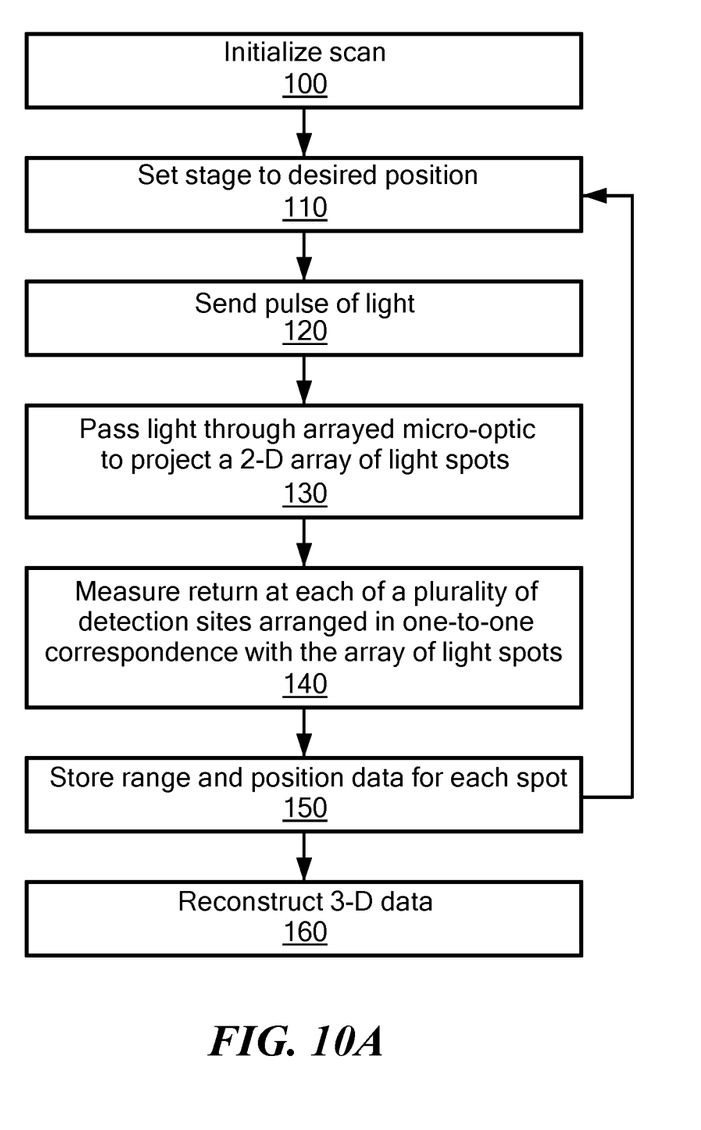
FIGS. 10A and 10B are flow charts corresponding to methods of the present invention.

Referring now to FIG. 10A, a method of performing an embodiment of the invention is described. In this embodiment, a single control loop operates the movement of the scanner along with the ranged detection functions. Control begins with initialization of the scan 100. The scanner is set to a desired position 110 to orient the two dimensional array of light spots toward the scene of interest. The light source is activated to send a pulse of light 120. The light is passed through the arrayed micro-optic to project the two dimensional array of light spots 130. The light from the array of light spots is received in one-to-one correspondence to the array of optical detection sites. For each of the optical detection sites, the return time is measured 140 and thus the time-of-flight is determined individually for each of the spots in the array. From the time-of-flight, the distance to each spot in the array is calculated. The distance, i.e., the range, for each spot and the position of the spot as determined by the orientation of the scanner and the location of the spot in the array are stored 150 in memory. To repeat this loop, the scanner is repositioned so as to move the two dimensional array of light spots along a scanning path, typically a raster path. When the scene has been scanned, a three-dimensional reconstruction 160 of the scene can be completed.

Figure 10B:
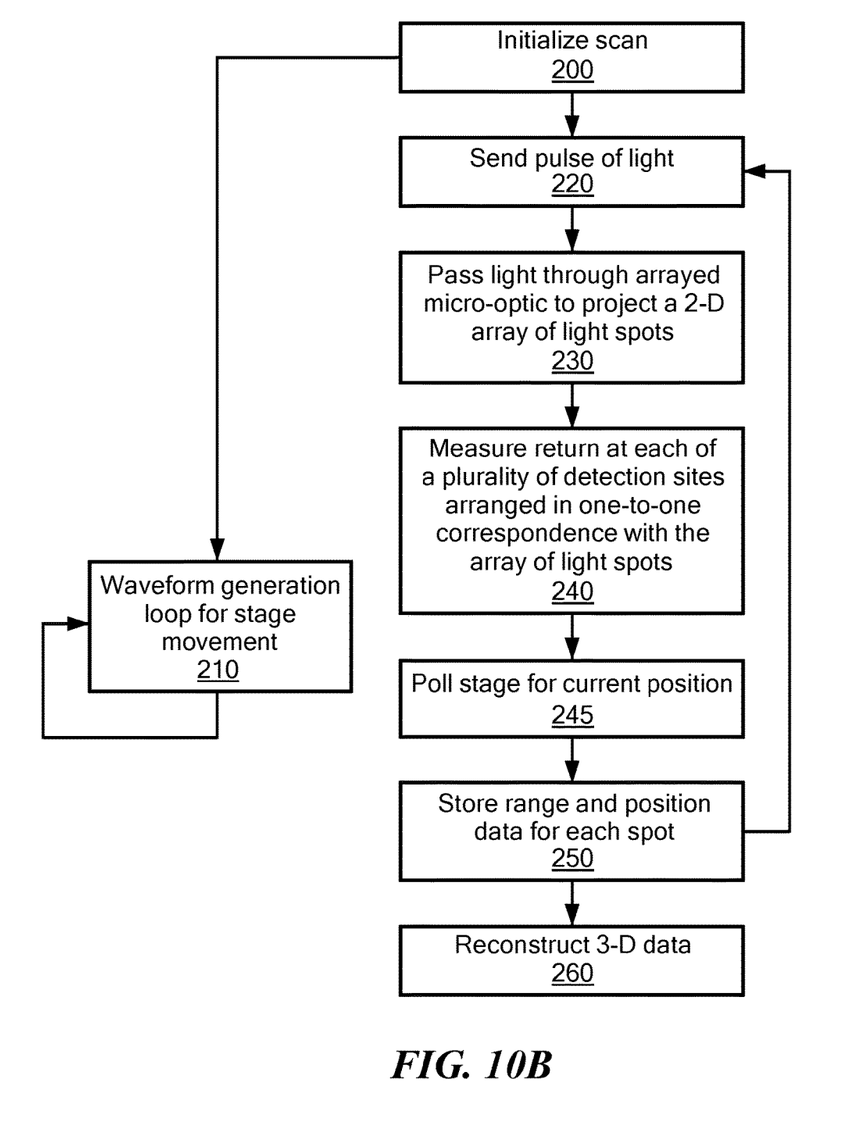

In another embodiment of the method, FIG. 10B shows two control loops running somewhat independently. One loop controls the scanner oscillation. The other loop performs the range detection. We show the control loops beginning with initialization of the scan 200. A waveform generation loop is activated to control the scanner oscillation 210. The movement produced by the scanner causes the two dimensional array to follow a scanning path, typically a raster path. Contemporaneously, the range detection loop proceeds. The light source is activated to send a pulse of light 220. The light is passed through the arrayed micro-optic to project the two dimensional array of light spots 230. The light from the array of light spots is received in one-to-one correspondence to the array of optical detection sites. For each of the optical detection sites, the return time is measured 240 and thus the time-of-flight is determined individually for each of the spots in the array. From the time-of-flight, the distance to each spot in the array is calculated. Polling 245 of the scanner takes place to determine the current position of the light spots. The polling 245 can be moved anywhere in the range detection loop because the laser pulsing is so much faster than the scanner movement, that the scanner movement between pulses is negligible. The distance, i.e., the range, for each spot and the position of the spot as determined by the orientation of the scanner and the location of the spot in the array are stored 250 in memory. This range detection loop can be immediately repeated. When the scene has been scanned, a three-dimensional reconstruction 160 of the scene can be completed.

By making use of a two dimensional array of isolated light spots and individual optical detection sites in one-to-one correspondence with those spots, cross-talk and multipath signal are advantageously reduced. Moreover, a much smaller scanning motion is required, thereby permitting the use of smaller and/or simpler and less expensive scanning mechanisms. To complete a scan of the scene, the arrayed micro-optic and the receiver optics only have to be scanned the distance between illumination spots.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A light detection and ranging (LiDAR) system comprising:
   a light source;
   an arrayed micro-optic configured to receive light from the light source so as to produce and project a two dimensional array of light spots on a scene, wherein the two dimensions of the array includes a first dimensional direction and a second dimensional direction;
   receiver optics having an array of optical detection sites configured so as to be suitable for establishing a one-to-one correspondence between light spots in the two dimensional array and optical detection sites in the receiver optics;
   a scanner configured to physically oscillate the arrayed micro-optic and the receiver optics synchronously to scan: (a) the two dimensional array of light spots and (b) the receiver optics so as to maintain the one-to-one correspondence; and
   a scan controller operable to cause the scanner to move the array of light spots back and forth so as to complete a scan of the scene wherein the spots traverse the scene in the first dimensional direction and in the second dimensional direction no more than 150% of the distance between adjacent spots in the first dimensional direction and in the second dimensional direction, respectively.

2. The LiDAR system according to claim 1 wherein the scan controller is operable to cause the scanner to move the array of light spots back and forth so as to complete a scan of the scene wherein the spots traverse the scene in the first dimensional direction and in the second dimensional direction no more than 110% of the distance between adjacent spots in the first dimensional direction and in the second dimensional direction, respectively.

3. The LiDAR system according to claim 1 wherein the scan controller is operable to cause the scanner to move the array of light spots back and forth so as to complete a scan of the scene wherein the spots traverse the scene in the first dimensional direction and in the second dimensional direction no more than the distance between adjacent spots in the first dimensional direction and in the second dimensional direction, respectively.

4. The LiDAR system according to claim 1 wherein the back and forth movement of the array of light spots comprises a raster path.

5. The LiDAR system according to claim 1 wherein the receiver optics includes a mask defining a plurality of transparent apertures arranged according to the two dimensional array, the plurality of transparent apertures limiting visibility by each optical detection site to a single corresponding light spot in the two dimensional array.

6. The LiDAR system according to claim 1 wherein the first dimensional direction is horizontal and the second dimensional direction is vertical.

7. The LiDAR system according to claim 1, wherein the scanner comprises an x-y stage.

8. The LiDAR system according to claim 1, wherein the scanner comprises a compound lens.

9. The LiDAR system according to claim 1, wherein the receiver optics comprises a pixelated optical sensor array.

10. The LiDAR system according to claim 1, wherein the arrayed micro-optic comprises a diffractive optic.

11. The LiDAR system according to claim 1, wherein the arrayed micro-optic comprises a lens array.

12. The LiDAR system according to claim 1, wherein the arrayed micro-optic comprises an aperture array.

13. The LiDAR system according to claim 1, further comprising a LiDAR controller for calculating distance to the light spots on the scene from time-of-flight of light received at the receiver optics.

14. A method for scanning with a light detection and ranging (LiDAR) system comprising:
   activating a light from a light source;
   projecting the light through an arrayed micro-optic to produce and project a two dimensional array of light spots on a scene, the two dimensions of the array including a first dimensional direction and a second dimensional direction;
   receiving light from the array of light spots in one-to-one correspondence to an array of optical detection sites in receiver optics;
   physically oscillating the arrayed micro-optic and the receiver optics synchronously to scan the two dimensional array of light spots and the receiver optics so as to maintain the one-to-one correspondence and to complete a scan of the scene wherein the spots traverse the scene in the first dimensional direction and in the second dimensional direction no more than 150% of the distance between adjacent spots in the first dimensional direction and in the second dimensional direction, respectively.

15. The scanning method according to claim 14 wherein the physically oscillating completes a scan of the scene wherein the spots traverse the scene in the first dimensional direction and in the second dimensional direction no more than 110% of the distance between adjacent spots in the first dimensional direction and in the second dimensional direction, respectively.

16. The scanning method according to claim 14 wherein the physically oscillating completes a scan of the scene wherein the spots traverse the scene in the first dimensional direction and in the second dimensional direction no more than the distance between adjacent spots in the first dimensional direction and in the second dimensional direction, respectively.

17. The scanning method according to claim 14, further comprising calculating distance to the light spots on the scene from time-of-flight of light received at the receiver optics.

18. A light detection and ranging (LiDAR) system comprising:
   a light source;
   means for receiving light from the light source and for projecting a two dimensional array of light spots on a scene, wherein the two dimensions of the array includes a first dimensional direction and a second dimensional direction;
   receiver optics having an array of optical detection sites configured so as to be suitable for establishing a one-to-one correspondence between light spots in the two dimensional array and optical detection sites in the receiver optics;
   oscillating means for physically oscillating the receiver optics and the means for receiving and projecting to synchronously scan the two dimensional array of light spots and the receiver optics so as to maintain the one-to-one correspondence; and
   a scan controller operable to cause the oscillating means to move the array of light spots back and forth so as to complete a scan of the scene wherein the spots traverse the scene in the first dimensional direction and in the second dimensional direction no more than 110% of the distance between adjacent spots in the first dimensional direction and in the second dimensional direction, respectively.

19. The LiDAR system according to claim 18, wherein the means for receiving and projecting comprises a diffractive optic.

20. The LiDAR system according to claim 18, wherein the means for receiving and projecting comprises a lens array.

21. The LiDAR system according to claim 18, wherein the means for receiving and projecting comprises an aperture array.

22. The LiDAR system according to claim 18, wherein the oscillating means comprises an x-y stage.

23. The LiDAR system according to claim 18, further comprising a LiDAR controller for calculating distance to the light spots on the scene from time-of-flight of light received at the receiver optics.

* * * * *